(12) United States Patent
Park

(10) Patent No.: US 11,281,231 B2
(45) Date of Patent: Mar. 22, 2022

(54) ROBOT SYSTEM AND CONTROL METHOD THEREOF

(71) Applicant: LG ELECTRONICS INC., Seoul (KR)

(72) Inventor: Ji Yoon Park, Goyang-si (KR)

(73) Assignee: LG ELECTRONICS INC., Seoul (KR)

( * ) Notice: Subject to any disclaimer, the term of this patent is extended or adjusted under 35 U.S.C. 154(b) by 384 days.

(21) Appl. No.: 16/554,542

(22) Filed: Aug. 28, 2019

(65) Prior Publication Data

US 2020/0379482 A1 Dec. 3, 2020

(30) Foreign Application Priority Data

Jun. 3, 2019 (KR) .................. 10-2019-0065549
Jul. 23, 2019 (KR) .................. 10-2019-0088922

(51) Int. Cl.
*G05B 19/418* (2006.01)
*G05D 1/02* (2020.01)
*B25J 13/00* (2006.01)

(52) U.S. Cl.
CPC .......... *G05D 1/0287* (2013.01); *B25J 13/006* (2013.01); *G05D 1/0297* (2013.01); *G05D 2201/0211* (2013.01)

(58) Field of Classification Search
CPC ............... G05D 1/0287; G05D 1/0297; G05D 2201/0211; B25J 13/006; B25J 9/0084; B25J 11/008
See application file for complete search history.

(56) References Cited

U.S. PATENT DOCUMENTS

| 9,741,010 | B1* | 8/2017 | Heinla | G06Q 10/083 |
| 10,537,194 | B2* | 1/2020 | Byers | A47G 29/141 |
| 10,894,664 | B1* | 1/2021 | Brady | B65G 1/0492 |
| 2016/0277205 | A1* | 9/2016 | Liu | G06K 7/1417 |
| 2018/0300676 | A1* | 10/2018 | Peterson | G05D 1/0246 |
| 2019/0130349 | A1* | 5/2019 | Ferguson | G06Q 10/08355 |
| 2020/0209821 | A1* | 7/2020 | Heinla | G05B 19/4155 |

FOREIGN PATENT DOCUMENTS

| KR | 1020170110341 | 10/2017 |
| KR | 1020180123298 | 11/2018 |

* cited by examiner

*Primary Examiner* — Abby Y Lin
*Assistant Examiner* — Sohana Tanju Khayer
(74) *Attorney, Agent, or Firm* — Lee Hong Degerman Kang & Waimey

(57) ABSTRACT

Disclosed are a robot system and a control method thereof. The robot system includes a first server, a first robot which is registered on the first server and which delivers an item to a user according to information received from the first server, a second robot which is configured to interoperate with the first robot and which receives the item from the first robot, and a second server on which the second robot is registered and which operates the second robot. The method for controlling the robot system includes transmitting customer information to the first robot by means of the first server, authenticating the first server, by means of the second robot, so as to allow the first server to access the second robot, and requesting the first robot, by means of the first server, to couple with the second robot so as to allow the first robot to operate in correspondence with operation of the second robot.

16 Claims, 9 Drawing Sheets

ROBOT SYSTEM AND CONTROL METHOD THEREOF

CROSS-REFERENCE TO RELATED APPLICATION

Pursuant to 35 U.S.C. § 119(a), this application claims the benefit of earlier filing date of and right of priority to Korean Application Nos. 10-2019-0065549, filed on Jun. 3, 2019, and 10-2019-0088922, filed on Jul. 23, 2019, the contents of which are all hereby incorporated by reference herein in their entirety.

BACKGROUND

1. Technical Field

The present disclosure relates to a robot system used for delivering items and a control method thereof.

2. Description of Related Art

The content described in this section merely provides background information for the present disclosure, and does not constitute prior art.

Artificial intelligence robots are being developed and distributed at a rapid pace. Accordingly, when a customer places an order purchasing an item, an artificial intelligence domestic robot residing at the customer's residence may promote the convenience of the customer by receiving the item on the customer's behalf, rather than the customer receiving the item directly.

Meanwhile, the manner of item delivery is changing toward a method in which artificial intelligence delivery robots deliver items instead of conventional human workers, and item delivery using such artificial intelligence delivery robots is becoming increasingly common and commercialized.

In Korean Patent Application Publication No. 10-2018-0123298 A, a method is disclosed for delivering, to an original shipping address, a delivery item collected from a source area in each delivery region by a delivery robot.

However, Korean Patent Application Publication No. 10-2018-0123298 A does not disclose a configuration relating to a domestic robot that resides at a customer's residence and helps the customer, and therefore does not disclose a configuration in which interaction between an item delivery robot and a domestic robot may take place.

In Korean Patent Application Publication No. KR 10-2017-0110341 A, a configuration is disclosed in which an unmanned delivery robot identifies a user when the unmanned delivery robot reaches the user's location.

However, since the user needs to be located near the unmanned delivery robot, and active intervention, such as the user directly receiving the delivered item, is needed, the user is still inconvenienced.

SUMMARY

The present disclosure is directed to providing a robot system and a method for controlling the robot system, wherein a first robot and a second robot perform smooth and efficient delivery of items.

The present disclosure is further directed to providing a method for controlling a robot system capable of smoothly delivering items even when the types of the first robot and the second robot are different.

The present disclosure is still further directed to providing a method for controlling a robot system which increases security between a server, a user terminal, and a robot, and increases the convenience of a customer.

The present disclosure is not limited to what has been described above. It will be apparent to those skilled in the art that various changes in form and details may be made therein without departing from the spirit and scope of the present disclosure as defined by the following claims.

A robot system according to an embodiment of the present disclosure may be configured such that a server, a first robot, a second robot, and a user terminal interoperate with each other.

The robot system according to this embodiment of the present disclosure may include a first server, a first robot which is registered on the first server and which delivers an item to a user according to information received from the first server, a second robot which resides in the residence of a customer and receives the item from the first robot, and a second server on which the second robot is registered, and which operates a second robot.

A robot system according to another embodiment of the present disclosure may further include a user terminal in which a second robot is registered, and which is connected to the second robot and a second server.

A method for controlling a robot system according to still another embodiment of the present disclosure may include transmitting, to a second robot by means of a user terminal, a signal commanding the second robot and a first robot to interoperate with each other, authenticating a first server, by means of the second robot, so as to allow the first server to access the second robot, and requesting the first robot, by means of the first server, to couple with the second robot so as to allow the first robot to operate in correspondence with operation of the second robot.

A method for controlling a robot system according to yet another embodiment of the present disclosure may further include transmitting customer information to a first robot by means of a first server, and transmitting information on the first robot to a user terminal by means of the first server.

In this case, in the requesting the first robot to couple with the second robot, the first server may receive information relating to operation characteristics of the second robot from the second robot, and transmit the information to the first robot.

Meanwhile, the first server may perform steps for designating at least one among a plurality of first robots and transmitting customer information to the designated first robot, notifying the user terminal that the first robot is in the process of delivering an item, requesting authentication from the second robot so as to allow the first server to access the second robot, and receiving confirmation from the first robot that interoperation between the first robot and the second robot has been established.

In addition, the first robot may perform steps for receiving customer information from the first server, receiving, from the first server, information required for interoperation with the second robot, receiving, from the first server, a coupling request requesting the first robot to couple with the second robot, and transmitting confirmation to the first server that interoperation between the first robot and the second robot has been established.

Further, a second robot may perform steps of receiving, from the first server or a user terminal, information related to item delivery, authenticating the first server so as to allow the first server to access the second robot, and interoperating with the first robot through the first server.

According to embodiments of the present disclosure, the first robot and the second robot may interoperate with each other to perform operations corresponding to each other in real time. Therefore smooth and effective item delivery may be performed in an automatic and effective manner, without active intervention of a customer.

In addition, according to the embodiments of the present disclosure, the first robot and the second robot may interoperate with each other to specifically identify operation characteristics of each other. Therefore, even when various kinds of first robots and second robots interoperate with each other, a delivery scenario suitable for each characteristic can be selected, and smooth item delivery may be performed regardless of the type of first robot and second robot.

In addition, according to the embodiments of the present disclosure, when the user terminal and the second robot are connected to each other in order to enable interoperation between the second robot and the first robot, a connection may be selected through a direct connection or the second server, depending on the location of the customer, while security is maintained. Therefore, the convenience of the customer may be increased, and high security may be maintained.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

Figure 6:
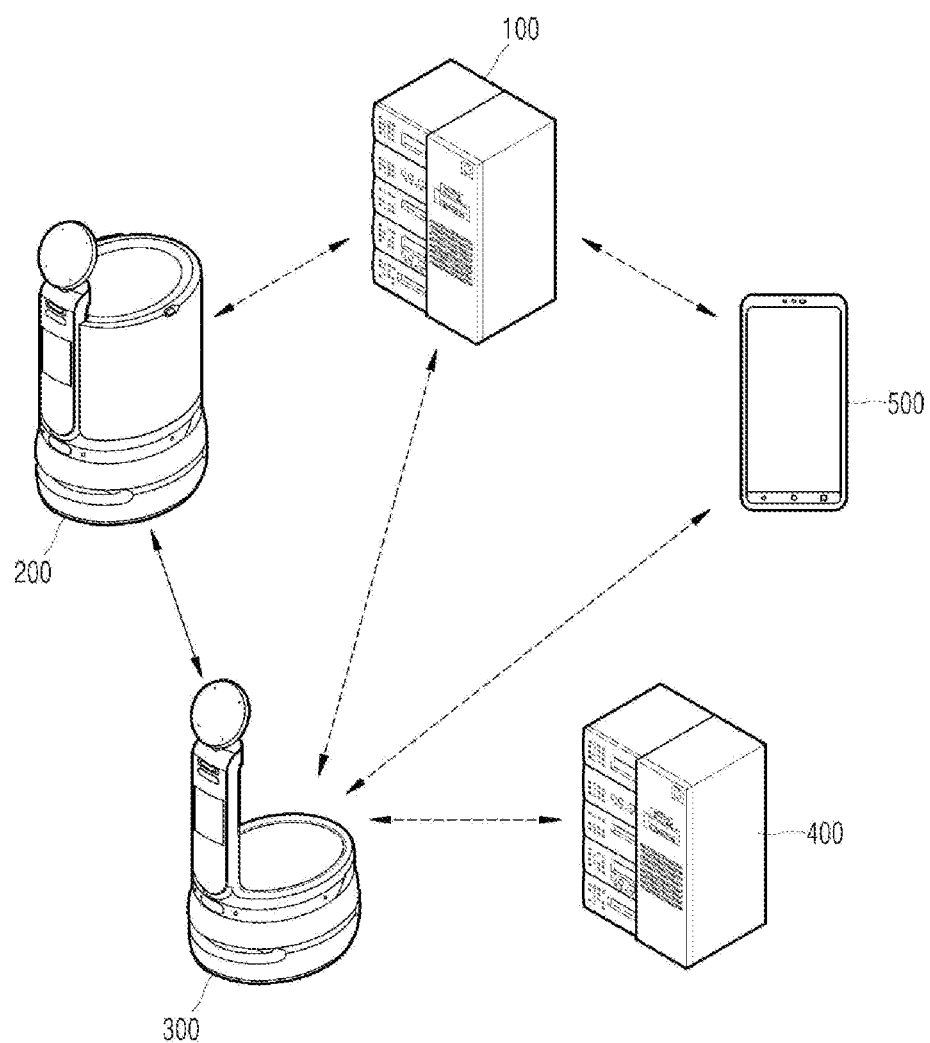
FIG. 6 is a schematic diagram illustrating a robot system in which a user terminal and a second robot are directly communicably connected with each other, according to an embodiment of the present disclosure.
Figure 7:
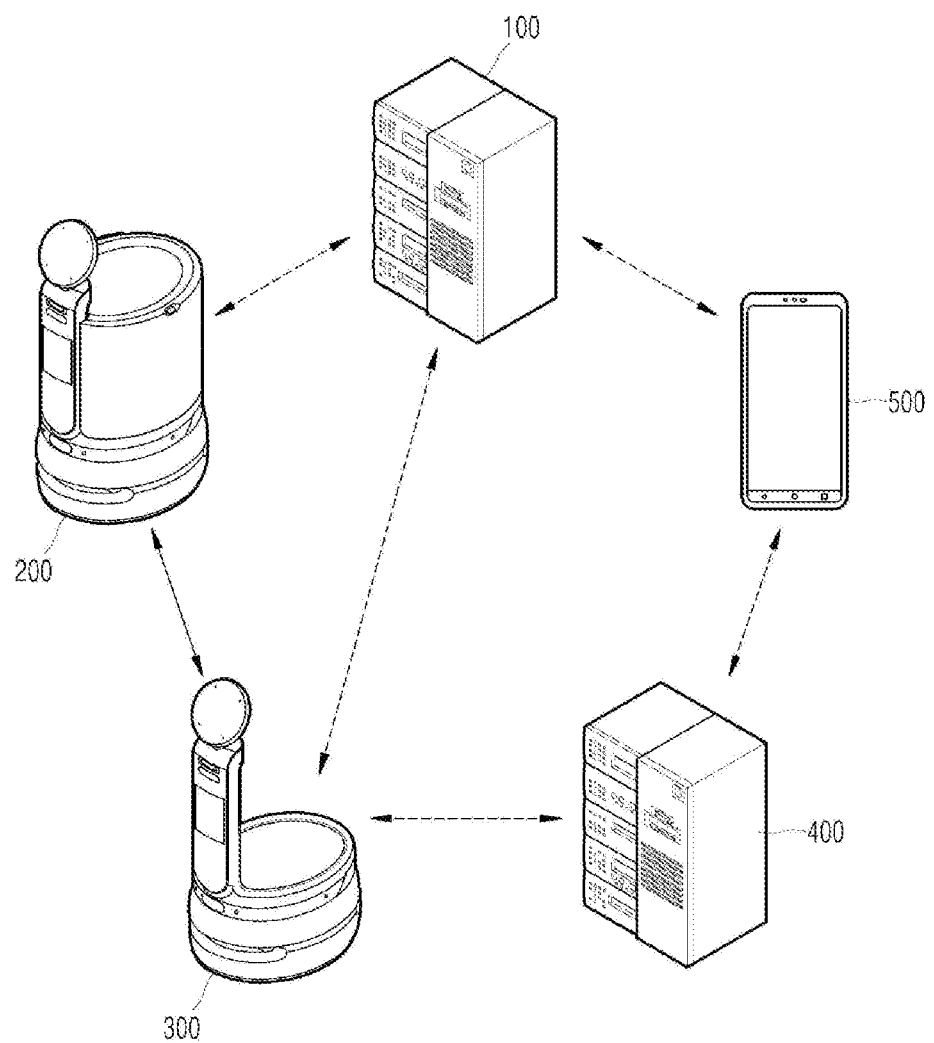
FIG. 7 is a schematic diagram illustrating a robot system when a user terminal and a second robot are connected to each other through a second server, according to an exemplary embodiment of the present disclosure.

The arrow in FIGS. 6 and 7 expressed by a solid line indicates that a first robot and a second robot are in a state of mutual interoperation.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

Although terms such as "first," "second," and "third" may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. In addition, the terms specifically defined in light of the composition and the action of the present disclosure are merely illustrative of the embodiments and are not intended to limit the scope of the embodiments.

In the present disclosure, when an element is referred to as being "on" or "under" another element, it can be directly on/under the element, and one or more intervening elements may also be present. In addition, expression of "on" or under" may include the meaning of a downward direction as well as an upward direction based on one element.

In addition, relational terms such as "up/upper/on" and "down/lower/under" used hereinafter do not necessarily request or imply any physical or logical relationship or order between such entities or elements, and may be used to distinguish one entity or element from another entity or element.

Figure 1A:
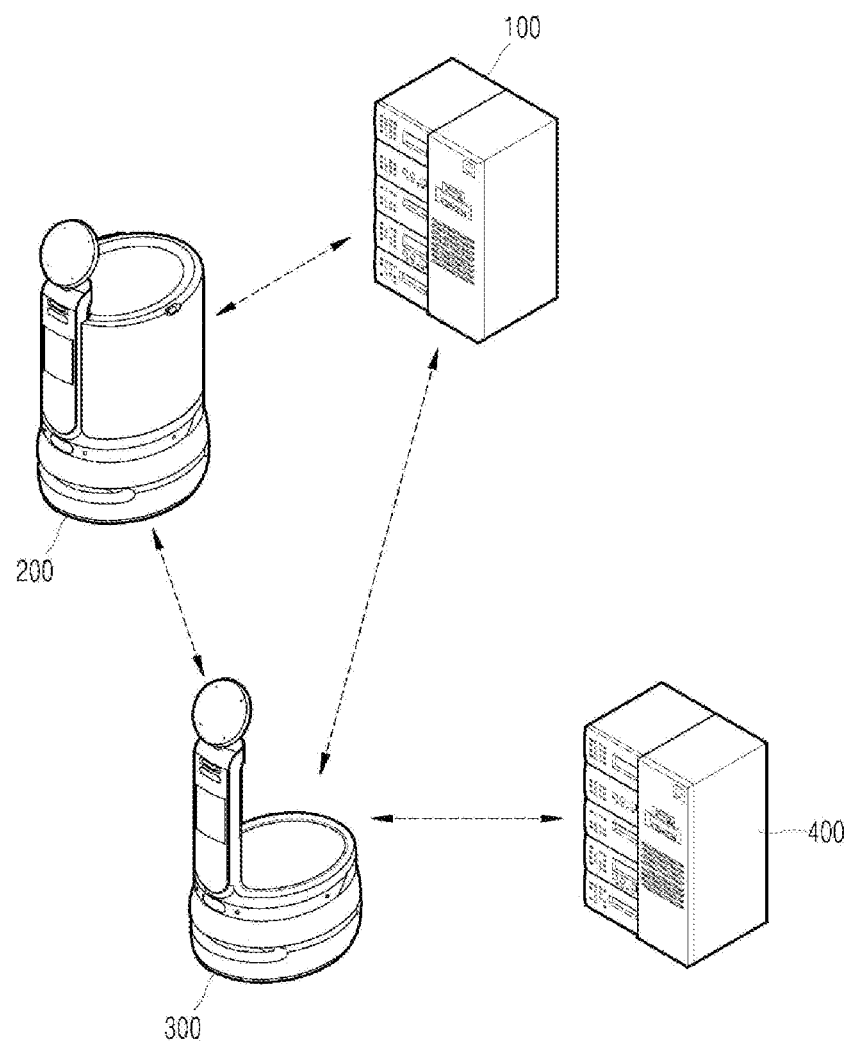
FIG. 1A is a schematic diagram illustrating a robot system according to an embodiment of the present disclosure.

FIG. 1A is a schematic diagram illustrating a robot system according to an embodiment of the present disclosure. According to an embodiment of the present disclosure, the robot system may be implemented such that a first robot 200 that delivers an item and a second robot 300 that operates at a customer's residence (for example, a home or an office) interoperate with each other in order to smoothly deliver the customer's desired item.

According to this embodiment of the present disclosure, the robot system may include a first server 100, a first robot 200, a second robot 300, and a second server 400. The first server is capable of communicating with the first robot 200, and may operate the first robot 200 by controlling the movement of the first robot 200.

The first robot 200 may transport the item that is being delivered to the customer to the second robot 300, which resides at the customer's residence. The first robot 200 may include, for example, a vehicle, a drone, or any form or structure capable of moving a predetermined distance while carrying an item. In this embodiment, a plurality of first robots 200 may be configured, and the first server 100 may specify a first robot 200 for the delivery of a specific item among a plurality of first robots 200 active at various locations.

The first robot 200 may be operated, for example, in a manner of receiving an item from an item collection site, and moving a long distance to reach the customer's residence. In another embodiment of the present disclosure, when the customer's residence is an apartment or an office building, the first robot 200 may reside within the apartment or the office building, and may be operated in a manner of moving a relatively short distance with an item received from an external third transportation method. The first robot 200 may be operated in various ways, regardless of distance or manner, as long as the first robot 200 is capable of transporting items.

The first robot 200 may deliver an item to a user according to information registered in the first server 100 and received from the first server 100. Therefore, the first robot 200 and the first server 100 may be communicably connected to each other, and to this end, the first server 100 may store information on the first robot 200.

More specifically, the first server 100 may store a MAC address and a robot ID of the first robot 200 in order to connect to the first robot 200. Meanwhile, the first robot 200 may store an authentication certificate required to access the first server 100. The authentication certificate that the first robot 200 stores may include, for example, a public key and a non-public key (private key), based on public key infrastructure (PKI).

Accordingly, the first server 100 may request access to the first robot 200 to be connected according to the MAC address and the robot ID, and the first robot 200 may authenticate the access of the first server 100. The first server 100 and the first robot 200 are thereby connected to each other, and the first robot 200 may thereby be operated by means of the first server 100.

Such connection between the first server 100 and the first robot 200 may be completed with one initial operation, except when a new first robot 200 is present.

After the connection between the first server 100 and the first robot 200 has been completed, the first robot 200 may receive, from the first server 100, customer information required for delivery of the item, such as personal information of the customer and the residential address of the customer, and store the received customer information. The first robot 200 may deliver the item to the customer's residence based on the stored customer information.

The second robot 300 resides in the customer's residence, and may receive an item from the first robot 200. The second robot 300 may be of any form, as long as it is capable of receiving the delivered item from the first robot 200.

For example, the second robot 300 may move a predetermined distance outside of the residence to meet the first robot 200 in order to receive the item from the first robot 200, or the second robot 300 may operate in a manner such that it only releases the door lock of the residence, and allows the unloading of the item in the residence to be done by the first robot 200.

The first robot 200 and the second robot 300 may be configured to operate in correspondence with each other for smooth item delivery. Accordingly, the first robot 200 and the second robot 300 may be coupled with each other, such that the first robot 200 may operate in correspondence with the operation of the second robot 300. This will be described in detail below.

The second robot 300 may be registered on the second server 400, and the second server 400 may operate the second robot 300. In order to operate the second robot 300, the second server 400 and the second robot 300 must be communicably connected with each other. Accordingly, the second server 400 may store the MAC address and the robot ID of the second robot 300, and the second robot 300 may store an authentication certificate required to access the second server 400.

Similar to the case of the first server 100 and the first robot 200, the second server 400 may request access to a second robot 300 to be connected according to the MAC address and the robot ID, and the second robot 300 may authenticate the access of the second server 400. The second server 400 and the second robot 300 are thereby connected to each other, and the second robot 300 may thereby be operated by the second server 400. Such connection between the second server 400 and the second robot 300 may be completed with one initial operation, except when a new second robot 300 is present.

The first server 100 and the second server 400 may be the same server. That is, the first server 100 and the second server 400 may be integrated into one server, so that all functions of the first server 100 and the second server 400 described above may be performed simultaneously.

Figure 1B:
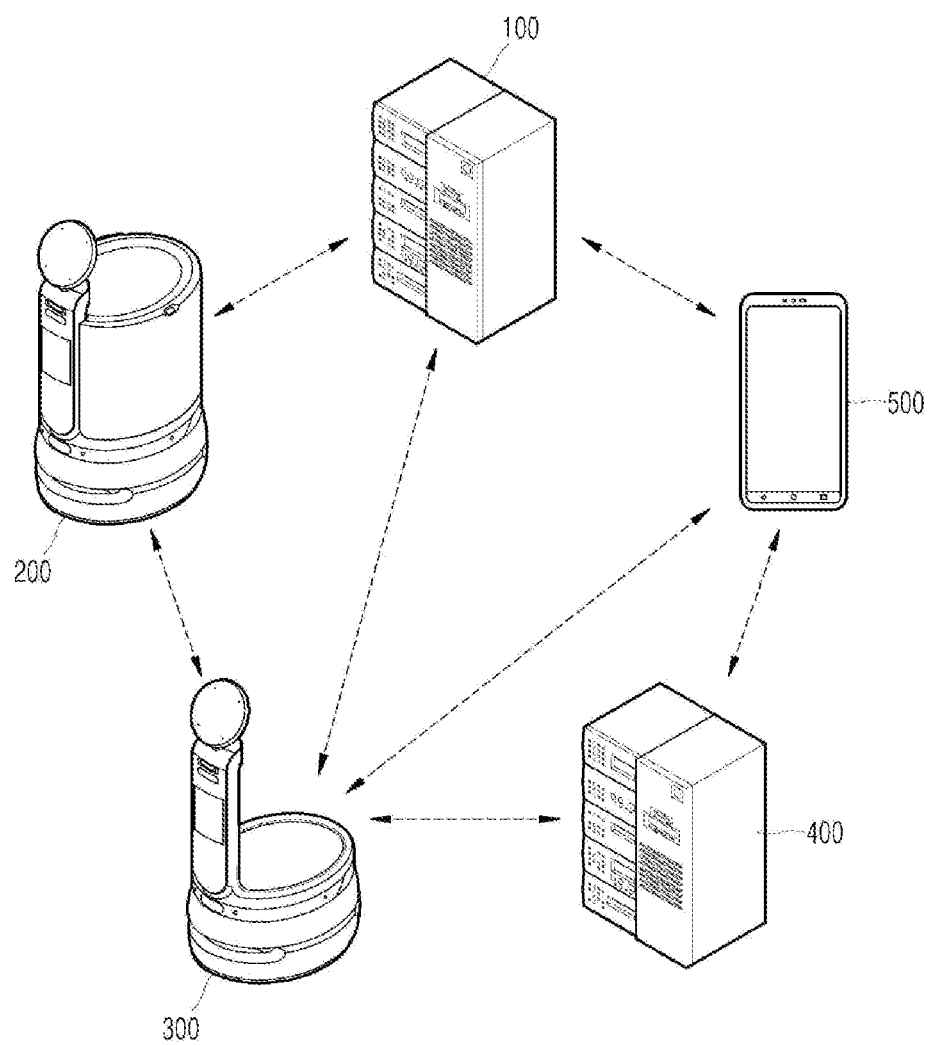
FIG. 1B is a schematic diagram illustrating a robot system according to another embodiment of the present disclosure.

FIG. 1B is a schematic diagram illustrating a robot system according to another embodiment of the present disclosure. As shown in FIG. 1B, the robot system may further include a user terminal 500. The second robot 300 may be registered in the user terminal 500, and the user terminal 500 may be connected to the second robot 300 and the second server 400. The user terminal 500 may be, for example, a smartphone or a tablet PC carried by a customer.

The user terminal 500 may be communicably connected with the first server 100, and may receive information about the first robot 200 from the first server 100. Examples of the information about the first robot 200 may include information indicating that the delivery of the ordered item has begun, detailed information on the item, detailed information on the first robot 200, and detailed information on the delivery schedule. The connection and communication between the user terminal 500 and the first server 100 may be established by a customer operating an application provided in the user terminal 500.

In addition, the customer may check the information on the first robot 200 received through the user terminal 500, and transmit an interoperation command to the second robot 300 so as to cause the second robot 300 and the first robot 200 to interoperate with each other.

The first robot and the second robot may include a mobile communication module, and through the mobile communication module may be connected with each other or with the first server 100, the second server 400, and the user terminal 500. Here, the mobile communication module may transmit and receive wireless signals from a mobile communication network constructed according to technical standards for mobile communications, or a communication method such as a Global System for Mobile communication (GSM), Code Division Multiple Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A), and Fifth Generation Mobile Communications (5G).

Similarly, the first server 100, the second server 400, and the user terminal 500 may be provided with the 5G communication module described above. In this case, the first robot 200, the second robot 300, the first server 100, the second server 400, and the user terminal 500 may transmit data at a rate of 100 Mbps to 20 Gbps. Therefore, a large volume of voice or image data may be transmitted very quickly. Accordingly, the first server 100, the second server 400, and the user terminal 500 may recognize a large volume of voice or image data transmitted from the first robot 200 and the second robot 300 more quickly and more accurately.

Each device (100, 200, 300, 400, 500) having a 5G communication module may support various types of intelligent communications, such as Internet of Things (IoT), Internet of Everything (IoE), and Internet of Small Things (IoST). The first robot 200 and the second robot 300 may support, for example, machine to machine (M2M) communication, vehicle-to-everything communication (V2X), and device to device (D2D) communication. Accordingly, each device (100, 200, 300, 400, and 500) may share information, which may be acquired in various devices and spaces, with each other in an efficient manner.

Figure 2A:
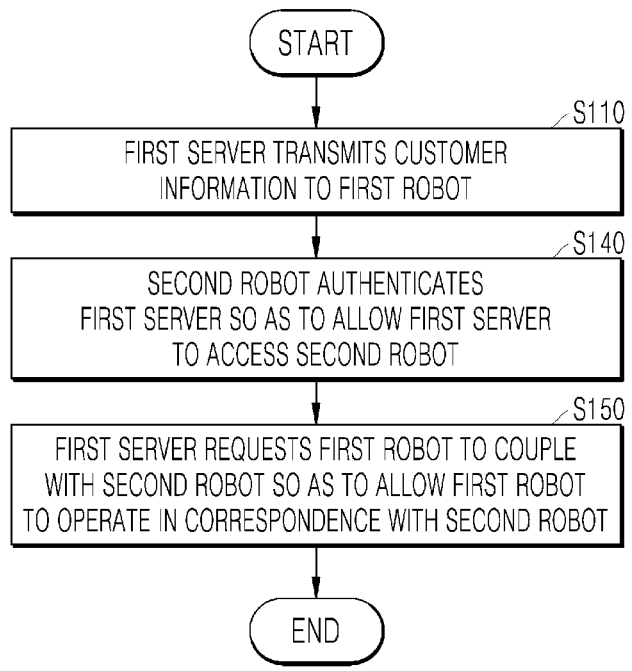
FIG. 2A is a flowchart illustrating a method for controlling a robot system according to an embodiment of the present disclosure.

A method for controlling a robot system using the robot system described above is described in detail below. FIG. 2A is a flowchart illustrating a method for controlling a robot system according to an embodiment of the present disclosure.

The method for controlling a robot system of an embodiment of the present disclosure may include a customer information transmitting step S110, an access authentication step S140, and a coupling request step S150.

In the customer information transmitting step S110, the first server 100 may transmit customer information to the first robot 200. The customer information may be information required for delivery of the item, such as personal information of the customer, a residence address of the customer to which the item is to be delivered, and detailed information such as information about the type, size, and number of the item requested by the customer.

Based on the received customer information, the first robot 200 may prepare for delivery of the item, such as by preparing and loading the item. The customer information may also include information specially requested by the customer, such as a delivery completion time and a special delivery location designated by the customer, and the first robot 200 may prepare for the delivery accordingly.

In the access authentication step S140, the second robot 300 may authenticate the first server 100 so as to allow the first server 100 to access the second robot 300. When authentication of the second robot 300 is completed, the first server 100 and the second robot 300 may be communicably connected with each other.

The second robot 300 may authenticate the first server 100 using, for example, an OAuth2 approval method, and thus authentication and connection may be conveniently performed using a social networking service (SNS) such as Facebook, Kakao Talk, Naver, and the like.

In the coupling request step S150, the first server 100 may request the first robot 200 to couple with the second robot 300 so as to allow the first robot 200 to operate in correspondence with the operation of the second robot 300.

The first server 100 may receive information about the second robot 300 from the second robot 300, and may, in order to enable smooth interaction between the second robot 300 and the first robot 200 that interoperate with each other, request the first robot 200 to couple with the second robot 300 so as to allow the first robot 200 to perform delivery according to the characteristics of the second robot 300.

Here, the coupling refers to the first robot 200 and the second robot 300 being continuously communicably connected to each another, so as to share detailed information about the item, ascertain each other's operation characteristics, and share their respective operation states in real time, in order to enable smooth delivery and unloading of the item.

When coupling is completed, the first robot 200 may, for example, identify the operation characteristics of the second robot 300 in advance, and select a delivery scenario suitable for the operation characteristics of the second robot 300. Further, through the coupling, each robot may ascertain a real time location and movement speed of the other robot. In addition, through the coupling, the first robot 200 and the second robot 300 may share information necessary for carrying and handling the item, such as information on the size, shape, and weight of the item.

For example, if the second robot 300 has an operation characteristic of being capable of carrying an item, the first robot 200 may select an item delivery scenario in which the first robot 200 meets the second robot 300 at a specific location, and passes the item to the second robot 300.

However, for example, if the second robot 300 has an operation characteristic of being unable to carry an item, the first robot 200 may select an item delivery scenario in which the second robot 300 opens the front door of the house of the customer, and the first robot 200 enters the home of the customer and loads the item at an appropriate location inside the home.

Therefore, in the coupling request step S150, the first server 100 may receive information on the operation characteristics of the second robot 300 from the second robot 300, and transmit the information to the first robot 200. The information about the operation characteristics of the second robot 300 may include, for example, whether the second robot 300 is a movable device, whether the second robot 300 has an item delivery function (and if so, what the transportable weight limit is), and information about the ability of second robot 300 to transport various different items and detailed operations performed when an item is transported.

The first robot 200 that receives the coupling request may select an item delivery scenario corresponding to the operation characteristics of the second robot 300, and complete an integrated coupling for transferring the item to the second robot 300.

Figure 2B:
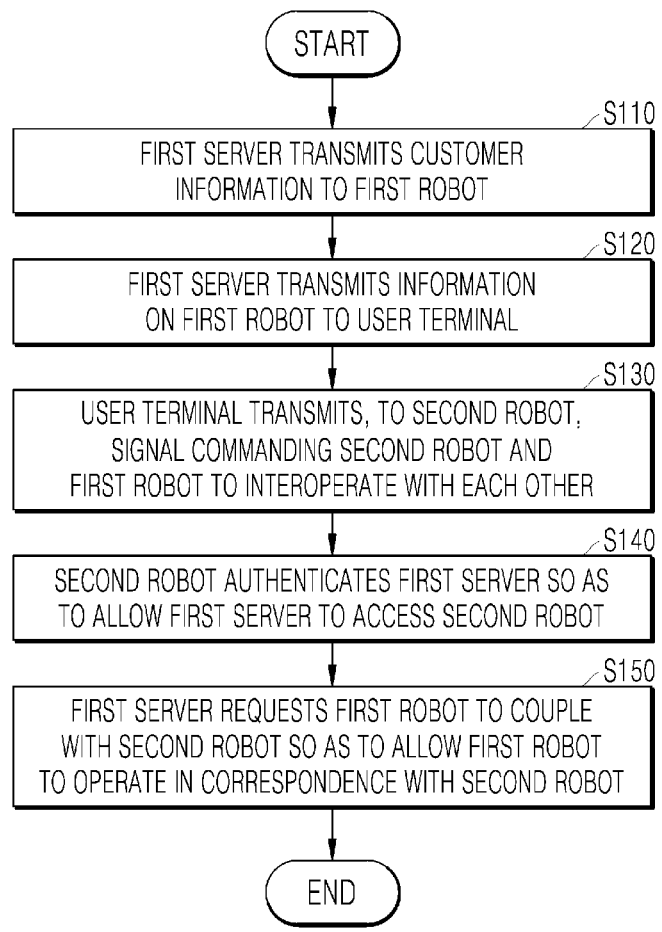
FIG. 2B is a flowchart illustrating a method for controlling a robot system according to another embodiment of the present disclosure.

FIG. 2B is a flowchart illustrating a method for controlling a robot system according to another embodiment of the present disclosure. As shown in FIG. 2B, the method for controlling a robot system may further include a first robot information transmitting step S120 and an interoperation command step S130, which are performed through the user terminal.

In the first robot information transmitting step S120, the first server 100 may transfer information on the first robot 200 to the user terminal 500. The information on the first robot 200 may include information on the type of the first robot 200 (for example, whether the first robot 200 is a vehicle or a drone), information related to the identity of the first robot 200 (such as a serial number of the first robot 200), and information on the type, number, and delivery location requested by the customer of the item being delivered. The customer may perform an interoperation command (to be described below) through the user terminal 500 when the information on the first robot 200 matches the request of the customer.

In the interoperation command step S130, the user terminal 500 may transmit, to the second robot 300, a signal commanding the second robot 300 and the first robot 200 to interoperate with each other. Such an interoperation command may be performed in a method in which the customer inputs voice or text into the user terminal 500, and the user terminal 500 transmits the received interoperation command signal to the second robot 300. Accordingly, the customer may issue the interoperation command to the second robot 300 via, for example, a voice command or a text command input through a UI of the user terminal 500.

In the embodiments of the present disclosure, interoperation between the second robot 300 and the first robot 200 may mean that the second robot 300, which is required for the delivery of the item, and the first robot 200 are connected to each other so as to be able to interact with each other. For example, the second robot 300 and the first robot 200 can be regarded as interoperating with each other when the second robot 300 and the first robot 200 are communicably connected with each other and real-time information is transmitted to and received from each other so as to share each other's form, operation characteristics, real-time location information, and set scenario required for handover of the item.

When the second robot 300 and the first robot 200 are interoperating with each other, the delivery of the item may be completed according to a set scenario. The set scenario may mean a phased and specific scenario, such as a scenario in which the first robot 200 carries the item and arrives at the door of the customer's house, the second robot 300 opens the front door of the customer's house in accordance with the arrival time of the first robot 200, when the first robot 200 enters the home, the second robot 300 approaches the first robot 200 and receives the item from the first robot 200, and the second robot 300 closes the front door when the first robot 200 exits the house.

The second robot 300 which has received the interoperation command from the user terminal 500 may perform an access authentication step S140.

However, for smooth item delivery, when the second robot and the first robot are in close proximity to each other, the second robot and the first robot may also be directly communicably connected with each other using a short-range communication method such as Wi-Fi or Bluetooth®, rather than being connected to each other through the first server.

When coupling request step S150 is completed, the interoperation between the second robot 300 and the first robot 200 for item delivery is established, and the second robot 300 and the first robot 200 may transfer real-time information to each other and proceed with item delivery.

In the embodiments of the present disclosure, the second robot 300 and the first robot 200 interoperate with each other to perform operations corresponding to each other in real time. Therefore smooth and effective item delivery may be performed in an automatic and effective manner, without active intervention of a customer.

In the embodiments of the present disclosure, the second robot 300 and the first robot 200 interoperate with each other to specifically identify each other's operation characteristics. Therefore, even when various types of first robots 200 and second robots 300 interoperate with each other, a delivery scenario suitable for each characteristic may be selected, and smooth item delivery may be performed regardless of the type of the second robot 300 and the first robot 200.

Meanwhile, in the embodiment of the present disclosure shown in FIG. 2A, too, a step similar to the first robot information transmitting step S120 and the interoperation command step S130 in FIG. 2B is required. In this case, the role performed by the user terminal 500 in the first robot information transmitting step S120 and the interoperation command step S130 may be performed by the second robot 300.

Since the customer is in close proximity to the second robot 300 when the customer is in the residence, the second robot 300 is capable of directly interacting with the customer. Therefore, the customer may input commands or information into the second robot 300 by means of, for example, a voice command or a text command entered via a UI. In addition, the second robot 300 may output a signal that can be visually or audibly perceived by the customer, such as voice or text, and may transmit information to the customer.

Therefore, according to the embodiment of the present disclosure shown in FIG. 2A, in a robot system, for example, the second robot 300 and the customer may directly exchange commands, information, and the like. Therefore, the first server 100 may deliver information about the first robot 200 to the second robot 300, and the customer may issue an interoperation command commanding the first robot 200 to interoperate with the second robot 300, without using the user terminal 500.

Figure 3:
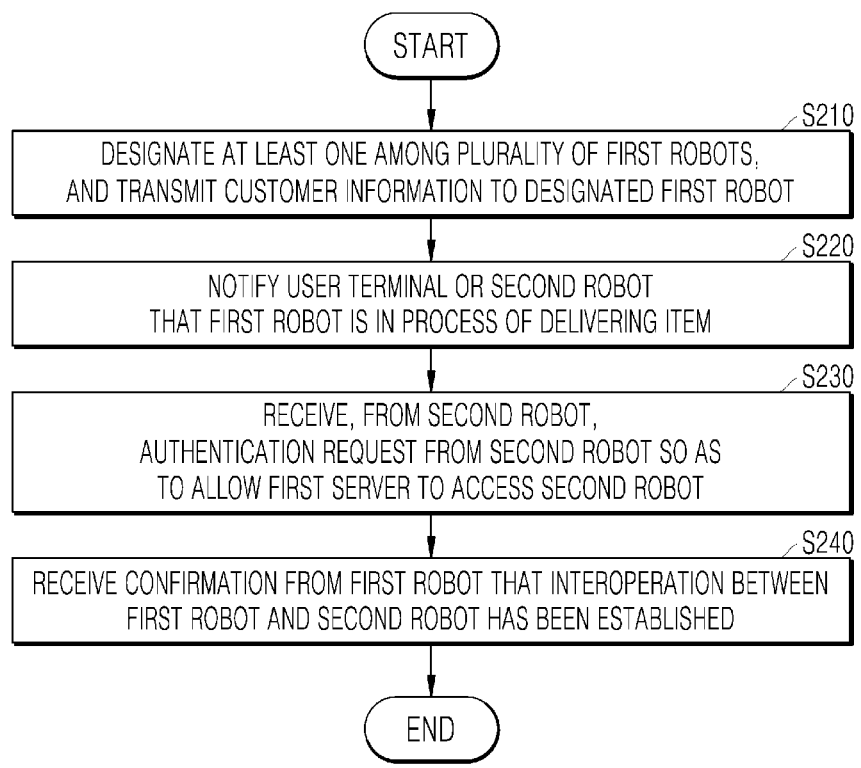
FIG. 3 is a flowchart illustrating a process in which a first server performs a method for controlling a robot system according to an embodiment of the present disclosure.

FIG. 3 is a flowchart illustrating a process in which a first server 100 performs a robot system control method according to an embodiment of the present disclosure. Hereinafter, the method for controlling the robot system of the above-described embodiment will be described in detail in terms of the first server 100. The first server 100 may perform item delivery through the following steps.

The first server 100 may designate at least one among a plurality of first robots 200, and transmit customer information to the designated first robot 200 (S210). When the first server 100 receives an item delivery request of the customer, the first server 100 may select a suitable first robot 200 among the plurality of first robots 200 registered on the first server 100, considering factors such as a location, specifications of the first robot 200, and operation characteristics of the first robots 200.

The first server 100 may transmit customer information required for item delivery so that the selected first robot 200 may proceed with the item delivery. In addition, the first server 100 may transmit, to the first robot 200, detailed information required for item delivery, such as information about the item to be delivered and information about a place where the item to be delivered is stored. The first robot 200 that receives such information may receive the delivery item and prepare for delivery.

The first server 100 may notify the user terminal 500 or the second robot 300 that the first robot 200 is in the process of delivering the item (S220). The customer who checks, through the user terminal 500 or the second robot 300, the delivery of the first robot 200 from the first server 100, may transmit, to the second robot 300, an interoperation command commanding the second robot 300 and the first robot 200 to interoperate with each other when the content of the item ordered by the customer and the content of the item received from the first server 100 match each other.

The second robot 300 may be connected to the first server 100 in order to perform delivery. Therefore, the first server 100 may receive, from the second robot 300, a request to authenticate the first server 100 so as to allow the first server 100 to access the second robot 300 (S230). As described above, the interoperation process between the second robot 300 and the first robot 200 may proceed through the first server 100.

When the coupling request step S150 is performed and the coupling between the second robot 300 and the first robot 200 is completed, the first server 100 may receive, from the first robot 200, confirmation that interoperation between the first robot 200 and the second robot 300 has been established (S240).

Thereafter, until item delivery is completed, if necessary, the first server 100 may transmit to the second robot 300 or the first robot 200, or receive from the second robot 300 or the first robot 200, information required for delivery of goods, in real time.

Figure 4:
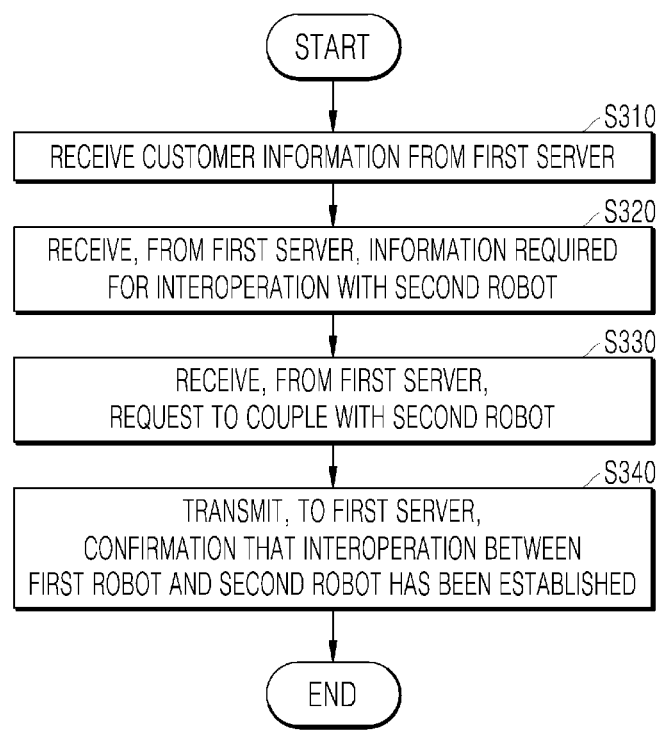
FIG. 4 is a flowchart illustrating a process in which a first robot performs a method for controlling a robot system according to an embodiment of the present disclosure.

FIG. 4 is a flowchart illustrating a process in which a first robot 200 performs a robot system control method according to an embodiment of the present disclosure. The robot system control method of the embodiment of the present disclosure described above will hereinafter be described in detail in terms of the first robot 200. The first robot 200 may perform item delivery through the following steps.

The first robot 200 may receive customer information from the first server 100 (S310). The first robot 200 may receive, from the first server 100, information required for item delivery, such as a specific information about an item to be delivered and a place where an article to be delivered is stored. The first robot 200 that receives such information may receive the delivery item and prepare for delivery.

The first robot 200 may receive, from the first server 100, information required for interoperation with the second robot 300 (S320). The information required for interoperation may include, for example, information on the form, operation characteristics, and real-time location information of the second robot 300, and a set scenario required for handover of the item.

The first robot 200 may receive, from the first server 100, a request to couple with the second robot 300 (S330). The first robot 200 that receives the coupling request may select an item delivery scenario corresponding to the operation characteristics of the second robot 300, and complete an integrated coupling for transferring the item to the second robot 300.

After the coupling is completed, the first robot 200 may transmit, to the first server 100, confirmation that the interoperation between the first robot 200 and the second robot 300 has been established (S340). The first robot 200 may transport the item to the customer's residence based on the information received in the interoperation process, and complete item delivery through interaction with the second robot 300 at the customer's residence.

Figure 5:
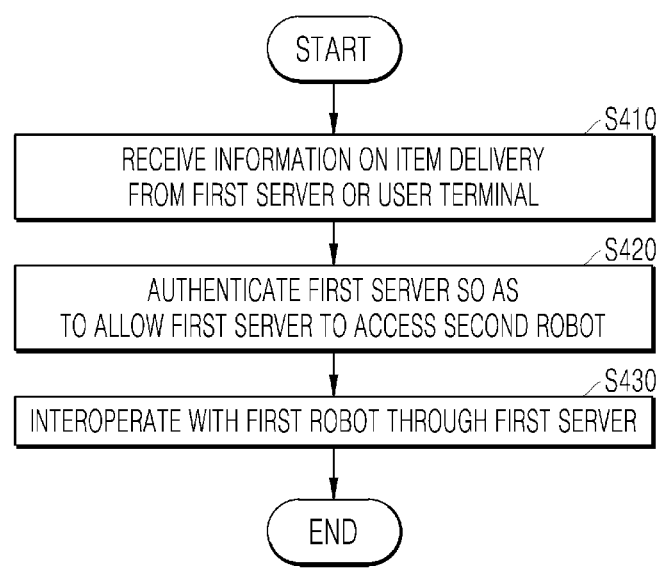
FIG. 5 is a flowchart illustrating a process in which a second robot performs a method for controlling a robot system according to an embodiment of the present disclosure.

FIG. 5 is a flowchart illustrating a process in which a first robot 300 performs a method for controlling a robot system according to an embodiment of the present disclosure. The robot system control method of the embodiment of the present disclosure described above will hereinafter be described in detail in terms of the second robot 300. The first robot 300 may perform item delivery through the following steps.

The second robot 300 may receive information on item delivery from the first server 100 or the user terminal 500 (S410). The second robot 300 may receive the information on item delivery, and then perform an item delivery operation through an interoperation process with the first robot 200 for delivery of the item.

The second robot 300 may selectively receive information on item delivery from the first server 100 or the user terminal 500. For example, when a customer is carrying the user terminal 500 and is located in the residence, the user terminal 500 and the second robot 300 may be directly connected to each other, and information about item delivery may be transferred from the user terminal 500 to the second robot 300.

For example, when the customer is not in the residence, the second robot 300 may connect to the user terminal 500 through the second server 400, and receive, from the user terminal 500, information on item delivery through the second server 400. The method in which the second robot 300 receives information on item delivery is described in detail below.

The second robot 300 may authenticate the first server 100 so as to allow the first server 100 to access the second robot 300 (S420). When the authentication is completed, the second server 400 may receive, from the second robot 300, information about the second robot 300 required for interoperation between the second robot 300 and the first robot 200.

Then, the second robot 300 may interoperate with the first robot 200 through the first server 100 (S430). After the interoperation is established, the second robot 300 may interact with the first robot 200 to perform the item delivery operation.

FIG. 6 is a schematic diagram illustrating a robot system when a user terminal 500 and a second robot 300 are directly communicably connected with each other, according to an embodiment of the present disclosure. In FIGS. 6 and 7, the arrow expressed by a solid line indicates that the first robot 200 and the second robot 300 are in a state of mutual interoperation.

In this embodiment of the present disclosure, the user terminal 500 is directly communicably connected with the second robot 300, and the second robot 300 may receive, from the user terminal 500 directly, an interoperation command commanding interoperation with the first robot 200.

At this time, the second robot 300 may be connected to the user terminal 500 by a short-range communication method, for example, Wi-Fi or Bluetooth®.

When the customer is carrying the user terminal 500 and is located in the residence, a short-range communication method is a suitable method to simply connect the second robot 300 and the user terminal 500, and such a direct connection may also be advantageous in terms of security. The second robot 300, for example, may be connected while maintaining security with the user terminal 500 in a WPA2 AES method.

When the second robot 300 and the user terminal 500 are directly connected, the interoperation command step S130 may proceed between the user terminal 500 and the second robot 300, without involving the first server 100.

FIG. 7 is a schematic diagram illustrating a robot system when a user terminal 500 and a second robot 300 are connected to each other through a second server 400, according to an embodiment of the present disclosure. For example, when the customer is not in the customer's residence, the customer carrying the user terminal 500 may connect the second robot 300 and the user terminal 500 from a remote location, and an interoperation command may be transmitted from the user terminal 500 to the second robot 300.

In the embodiment shown in FIG. 7, the user terminal 500 and the second robot 300 may be connected to each other through the second server 400. Accordingly, the second server 400 may receive, from the user terminal 500, the interoperation command commanding interoperation between the second robot 300 and the first robot 200, and transmit the interoperation command to the second robot 300.

In this case, security between the second server 400, the second robot 300, and the user terminal 500 is important. Therefore, for example, the second server 400 may authenticate access of the second robot 300 through an authentication certificate stored in the second robot 300, thereby connecting the second server 400 and the second robot 300 while maintaining security.

For the connection between the second server 400 and the user terminal 500, an appropriate authentication method is one in which security is maintained while at the same time enabling simple and rapid authentication for the convenience of the user. Therefore, for example, the second server 400 and the user terminal 500 may be simply connected to each other while maintaining security by using a Fast Identity Online (FIDO) authentication method, which uses biometric authentication methods such as fingerprint recognition and eye recognition.

In an embodiment of the present disclosure, when the user terminal 500 and the second robot 300 are connected to each other for interoperation between the second robot 300 and the first robot 200, while maintaining security, a connection may be selected through a direct connection or through the second server 400 depending on the location of the customer, thereby increasing the convenience of the customer and maintaining high security.

The present disclosure described above is not limited to the embodiments described herein and the accompanying drawings. It should be apparent to those skilled in the art that various substitutions, changes, and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A method for controlling a robot system, the method comprising:
    transmitting, from a first server to a first robot, customer information, wherein the first robot is configured to deliver an item to a user according to the customer information received from the first server;
    authenticating, at a second robot, the first server to allow the first server to access the second robot, wherein the second robot is associated with the user and is configured to receive the first item from the first robot and which is operated under control from a second server; and
    requesting the first robot to couple with the second robot to allow the first robot to operate in cooperation with operation of the second robot, the requesting being performed by the first server.

2. The method of claim 1, wherein the requesting includes:
    receiving, at the first server from the second robot, information relating to operation characteristics of the second robot; and
    transmitting the information relating to operation characteristics to the first robot.

3. The method of claim 1, wherein the method further comprises:
    transmitting, from the first server to a user terminal, information of the first robot, wherein the second robot is registered with the user terminal; and
    transmitting, from the user terminal to the second robot, a signal commanding the second robot and the first robot to interoperate with each other.

4. The method of claim 1, further comprising:
    designating, at the first server, the first robot from among a plurality of robots;
    notifying, by the first server, a user terminal or the second robot that the first robot is in a process of delivering the item;
    receiving, at the first server, a request for authentication from the second robot to allow the first server to access the second robot; and
    receiving, at the first server, confirmation from the first robot that interoperation between the first robot and the second robot has been established.

5. The method of claim 1, wherein the first server stores a MAC address and a robot ID of the first robot.

6. The method of claim 1, further comprising:
    receiving, at the first robot from the first server, the customer information;
    receiving, at the first robot from the first server, information required for interoperation with the second robot;
    receiving, at the first robot from the first server, a coupling request requesting coupling with the second robot; and
    transmitting confirmation to the first server that interoperation between the first robot and the second robot has been established.

7. The method of claim 6, further comprising:
    storing, at the first robot, an authentication certificate required to access the first server and storing customer information required for item delivery.

8. The method of claim 3, further comprising:
    receiving, at the second robot from the first server or the user terminal, information related to item delivery;
    authenticating, at the second robot, the first server to allow the first server to access the second robot; and
    interoperating the second robot with the first robot through the first server.

9. The method of claim 8, further comprising:
    storing, at the second server, a MAC address and a robot ID of the first robot; and
    storing, at the second robot, an authentication certificate required to access the second server.

10. The method of claim 3, wherein the user terminal includes a direct communication connection with the second robot, and the second robot directly receives, from the user terminal, an interoperation command commanding interoperation with the first robot.

11. The method of claim 10, wherein the second robot connects with the user terminal via Wi-Fi or Bluetooth®.

12. The method of claim 3, wherein the user terminal and the second robot are connected through the second server, and the method further comprises:
    receiving, by the second server from the user terminal, an interoperation command commanding interoperation between the second robot and the first robot; and
    transmitting the interoperation command to the second robot.

13. The method of claim 12, further comprising:
    authenticating, by the second server, access of the second robot through an authentication certificate stored in the second robot; and
    authenticating access of the user terminal through Fast Identity Online (FIDO).

14. A robot system, comprising:
    a first server;
    a first robot which is registered on the first server and which is configured to deliver an item to a user according to customer information received from the first server;

a second robot which is configured to receive the item from the first robot, wherein the second robot is associated with the user; and a second server at which the second robot is registered and which operates the second robot, wherein the first server is configured to transmit the customer information to the first robot;

wherein the second robot is configured to authenticate the first server to allow the first server to access the second robot; and wherein the first server is configured to request the first robot to couple with the second robot to allow the first robot to operate in correspondence with operation of the second robot.

15. The robot system of claim 14, further comprising:

a user terminal at which the second robot is registered and which is connected to the second robot and the second server, wherein the first server is configured to transmit information of the first robot to the user terminal; and wherein the user terminal is configured to transmit, to the second robot, a signal commanding the second robot and the first robot to interoperate with each other.

16. The robot system of claim 14, wherein the first robot and the second robot are coupled with each other to allow the first robot to operate in correspondence with the operation of the second robot.

* * * * *